(12) United States Patent
Papsdorf et al.

(10) Patent No.: US 8,448,776 B2
(45) Date of Patent: May 28, 2013

(54) APPARATUS FOR DIVERTING PRODUCTS AND METHODS OF HANDLING PRODUCTS (75) Inventors: Clifford Theodore Papsdorf, Miami, OH (US); Michael John Mers-Kelly, Hartford, ME (US); Adal Amine Tecleab, Woodlawn, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 213 days.

(21) Appl. No.: 13/047,355

(22) Filed: Mar. 14, 2011

(65) Prior Publication Data
US 2012/0234647 A1 Sep. 20, 2012

(51) Int. Cl.
*B65G 47/34* (2006.01)

(52) U.S. Cl.
USPC ............... 198/419.3; 198/370.08; 198/431

(58) Field of Classification Search
USPC .............. 198/370.08, 418.6, 419.3, 430, 431, 198/448, 449
See application file for complete search history.

(56) References Cited

U.S. PATENT DOCUMENTS

| | | | |
|---|---|---|---|
| 4,768,642 A | 9/1988 | Hunter | |
| 5,127,209 A | 7/1992 | Hunter | |
| 5,460,258 A * | 10/1995 | Tisma | ........................... 198/430 |
| 5,630,311 A * | 5/1997 | Flix | ................................. 53/543 |
| 5,667,055 A * | 9/1997 | Gambetti | ................... 198/419.3 |
| 6,019,213 A | 2/2000 | Schubert | |
| 6,425,476 B2 * | 7/2002 | Ghiotti et al. | ................. 198/426 |
| 6,808,061 B2 * | 10/2004 | Dennert | ........................ 198/430 |
| 6,925,784 B2 | 8/2005 | Escobar et al. | |
| 7,066,317 B2 * | 6/2006 | Iwasa et al. | .................... 198/431 |
| 7,533,768 B2 * | 5/2009 | Floding et al. | ............. 198/419.3 |
| 7,617,926 B2 | 11/2009 | Jacob et al. | |
| 7,757,462 B2 * | 7/2010 | Harrison et al. | ................ 53/447 |
| 2003/0057058 A1 * | 3/2003 | Iwasa | ......................... 198/419.3 |

FOREIGN PATENT DOCUMENTS

| | | |
|---|---|---|
| EP | 0 551 613 A1 | 7/1993 |
| GB | 2 342 908 A | 4/2000 |

OTHER PUBLICATIONS

PCT International Search Report, mailed Jul. 4, 2012, 5 pages.

* cited by examiner

*Primary Examiner* — Mark A Deuble
(74) *Attorney, Agent, or Firm* — Andrew J. Hagerty (57) ABSTRACT

A product handling system includes a product conveyor capable of transporting a plurality of products. An overhead diverter assembly includes a flighted conveyor situated substantially orthogonal to the product conveyor that includes a flight. A transport containment device is located at least partially below the flighted conveyor. A control system operates the overhead diverter such that the flighted conveyor has a diverting mode and a cassette filling mode. When the flighted conveyor is in the diverting mode, the flight moves in a profiled motion to acquire the product from the product conveyor at a location beneath the overhead diverter and transports the product along the transport containment device.

20 Claims, 9 Drawing Sheets

APPARATUS FOR DIVERTING PRODUCTS AND METHODS OF HANDLING PRODUCTS

TECHNICAL FIELD

The present invention is generally directed to apparatuses for diverting products and methods of handling products.

BACKGROUND

Various systems may be provided between a product supply and a packaging apparatus. For example, it is known to utilize conveyors and motorized systems to automatically transport product between processing operations. However, in some instances there may be a need to divert at least some of the product to a different processing operation. For example, guide rails or walls may be used to divert some product travelling along a conveyor line to a different conveying line. However, such systems may have limited control over how much product is being diverted and the arrangement or orientation of the product, once diverted.

SUMMARY

In one embodiment, a product handling system includes a product conveyor capable of transporting a plurality of products. An overhead diverter assembly includes a flighted conveyor situated substantially orthogonal to the product conveyor that includes a flight. A transport containment device is located at least partially below the flighted conveyor. A control system operates the overhead diverter such that the flighted conveyor has a diverting mode and a cassette filling mode. When the flighted conveyor is in the diverting mode, the flight moves in a profiled motion to acquire the product from the product conveyor at a location beneath the overhead diverter and transports the product along the transport containment device.

In another embodiment, a product handling system includes a product conveyor capable of transporting a plurality of products. An overhead diverter assembly includes at least three or more flighted conveyors. The overhead diverter includes a first flighted conveyor situated substantially orthogonal to the product conveyor. The first flighted conveyor includes a first train of first flights for diverting products from the product conveyor. A second flighted conveyor is situated substantially orthogonal to the product conveyor. The second flighted conveyor includes a second train of second flights for diverting products from the product conveyor. A third flighted conveyor is situated substantially orthogonal to the product conveyor. The third flighted conveyor includes a third train of third flights for diverting products from the product conveyor. A cassette conveyor includes a cassette conveyor belt that moves cassettes toward a transfer location. A control system operates the overhead diverter such that each of the first, second and third flighted conveyors has a diverting mode and a cassette filling mode. When at least one of the first, second and third flighted conveyors is in the cassette filling mode product diverted from the product conveyor is transferred to a cassette at the transfer location.

In another embodiment, a product handling system includes a flighted conveyor for transferring a collection of individual products having variable speed. A cassette conveyor has a substantially constant speed. A plurality of cassettes are disposed on the cassette conveyor. Each of the plurality of cassettes includes receptacles for receiving the collection of individual products from the flighted conveyor during a transfer operation. A synchronizing system includes an engaging structure that engages one or more of the plurality of cassettes to synchronize the speed and position of the one or more cassettes and the flighted conveyor during the transfer operation. The speed and positioning of the cassettes are controlled by the cassette conveyor at a point before and after the transfer operation.

BRIEF DESCRIPTION OF THE DRAWINGS

The following detailed description of specific embodiments of the present invention can be best understood when read in conjunction with the drawings enclosed herewith.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this specification using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Embodiments described herein generally relate to systems and methods for handling products that utilize an overhead diverter assembly for use in diverting some, but in some instances not all, product provided from a product supply. In other instances, all or none of the products may be diverted using the overhead diverter assembly. The products may be provided using a supply conveyor that includes a continuous conveyor belt that passes underneath the overhead diverter assembly. A flighted conveyor of the overhead diverter assembly may be controlled to allow either the passing of the product along the supply conveyor or the diverting of the product by engaging the product to transport the product away from the supply conveyor. The passing product may be delivered to a first packaging location and the diverted product may be delivered to a second packaging location that is different from the first packaging location. In other instances, all of the product may be diverted and delivered to the second packaging location.

The systems and methods described herein may be useful in handling mass quantities of a number of products, particularly relatively lightweight products of less than about 1000 grams, such as less than about 100 grams, such as less than about 12 grams, such as absorbent articles that include a wrapper, such as wrapped tampons for feminine hygiene. Often times, lightweight products, such as wrapped tampons, may be somewhat easily damaged during mass product handling. Damage can be to the tampon itself and/or to the wrapper. In various embodiments, the systems and methods described herein may be useful in handling quantities of products having a mass of over 1000 grams.

By "tampon" it is meant herein an absorbent article, in some embodiments, a disposable one, comprising absorbent material usually being compressed into a self-sustaining, generally oblong, typically essentially cylindrical shape. In most cases the absorbent material comprises fibrous material, e.g. rayon, wood pulp fluff, cotton or the like.

By "length" of a tampon it is meant herein the linear extension of a tampon along its largest dimension.

"Wrapper" as used herein refers to a structure, which is formed of a wrapper material and which substantially encloses an individual absorbent article, in some embodiments, an individual tampon, for packaging purposes. The wrapper may be constituted of one connected piece of wrapper material, though a wrapper can also be made from multiple pieces of material sufficiently joined together such that it substantially acts as one connected piece of wrapper material.

By "wrapper material" it is meant herein any material suitable to be used for hygienically wrapping tampons. Various wrappers and wrapper materials are described in, for example, U.S. Pat. No. 6,955,665.

Figure 1:
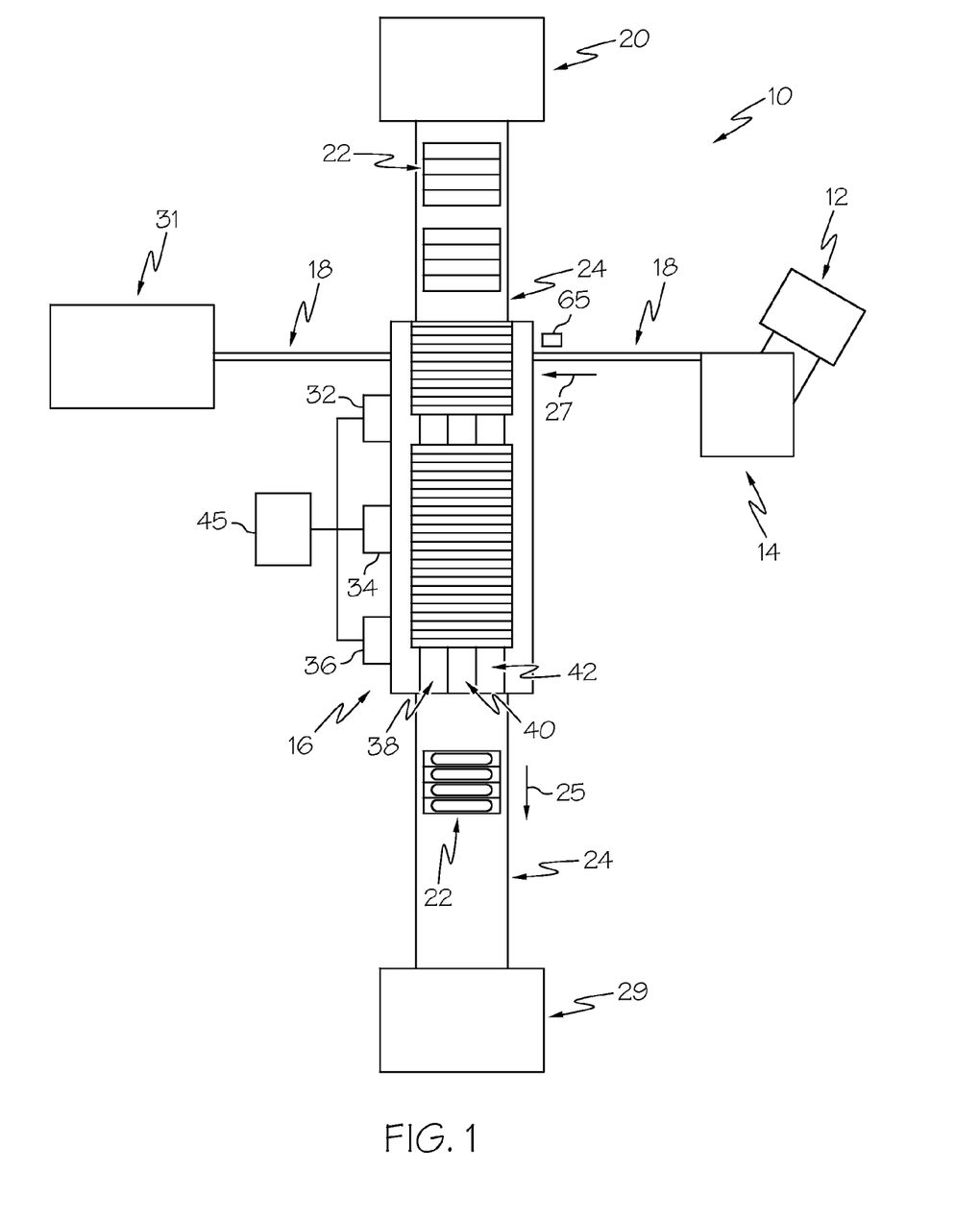
FIG. 1 is a diagrammatic plan view of an embodiment of a product handling system including an overhead diverter assembly.

Referring to FIG. 1, a product handling system 10 for use packing a product (e.g., a wrapped tampon) includes a product supply 12, a product feed system 14 and an overhead diverter assembly 16 that is located between the product feed system 14 and one or more packaging locations where the product is packaged. A product conveyor 18 delivers products from the product feed system 14 to the overhead diverter assembly 16. The product conveyor 18 may be any suitable conveyor type, such as a continuous belt-type vacuum conveyor. The product feed system 14 is capable of providing the product to the product conveyor 18 in an orderly lengthwise fashion, one product at a time. In some embodiments, between about 2 and about 1200 wrapped tampons or other product per minute, such as between about 100 and 800 wrapped tampons or other product per minute may be delivered to the product conveyor 18 from the product feed system 14 in a single file stream. The product conveyor 18 may deliver the product to the overhead diverter assembly 16 single file with one product in front of another product.

A cassette supply 20 provides cassettes 22 to a cassette conveyor 24, which is used to deliver the cassettes 22 to the overhead diverter assembly 16. As can be seen, the cassette conveying path represented by arrow 25 provided by the cassette conveyor 24 may be substantially perpendicular to a conveying path represented by arrow 27 provided by the product conveyor 18. However, non-perpendicular arrangements for the cassette conveyor 24 and the product conveyor 18 may be employed. The cassette conveyor 24 may be any suitable conveyor type, such as a continuous belt-type conveyor.

As will be described in greater detail below, the product that is diverted from the product conveyor 18 using the overhead diverter assembly 16 is delivered from the product conveyor 18 to a transfer location where the products are transferred to the cassettes 22 in a controlled fashion. The overhead diverter assembly 16 includes multiple axes that are controlled by servo motors 32, 34 and 36 and a control system 45. The control system 45, based at least in part on input from a product detecting sensor 65, utilizes each axis of the 3-axis diverter assembly 16 is used to control movement of a flighted conveyor assembly 38, 40 and 42 that is used to pick product from the product conveyor 18 and deliver the product to the cassettes 22. The cassettes 22 with product may then be delivered to a packaging location 29, for example, for packaging multiple product types into a package. The empty cassettes 22 may then recycle through a loop back to the overhead diverter assembly 16 for delivery of product. Product that is allowed to pass through the overhead diverter assembly 16 may continue to move along the product conveyor 18 or multiple product conveyors to a different packaging location 31 (or some other location-type other than for packaging) where the product of a single type is packaged in a package.

Figure 2:
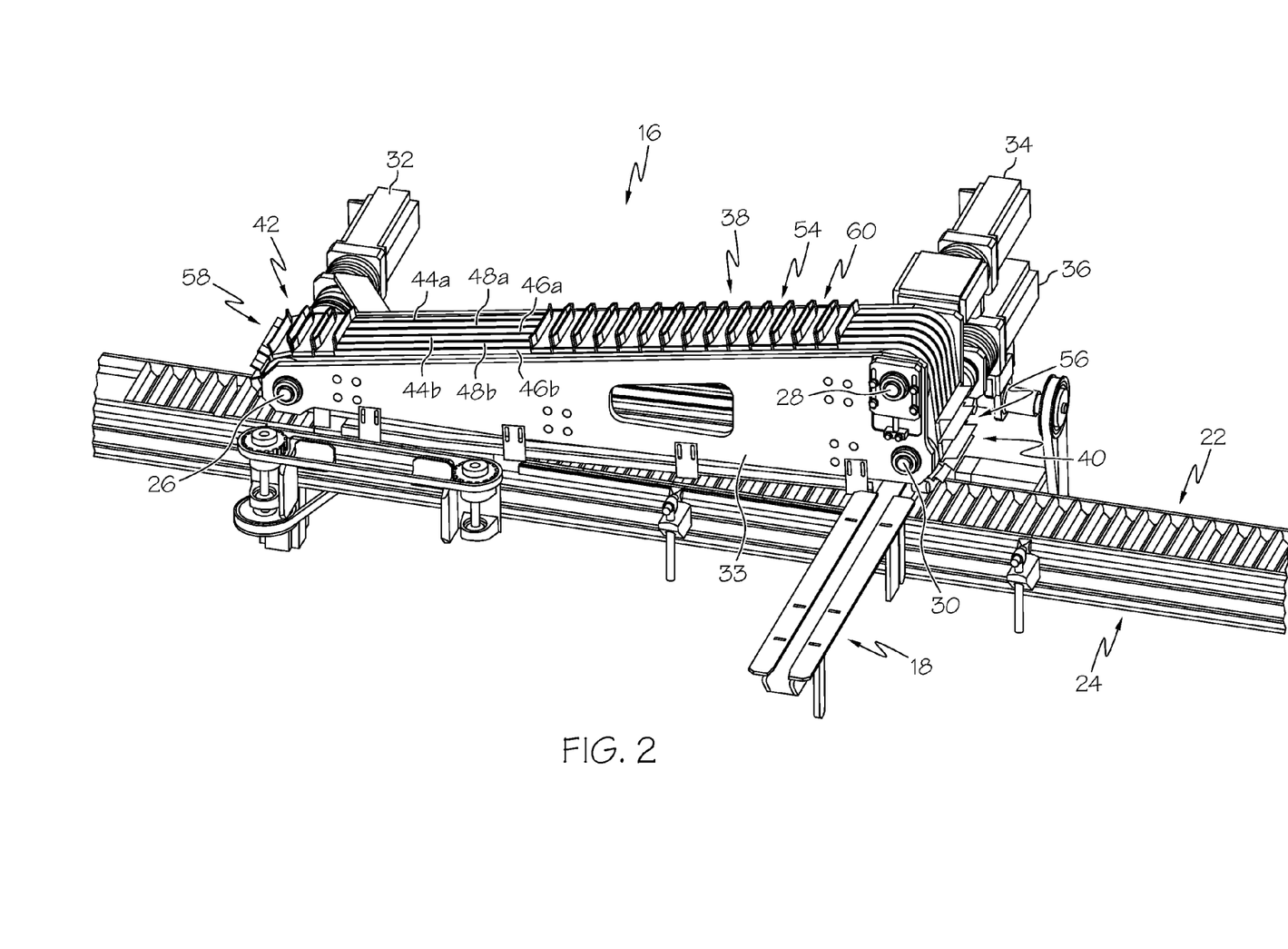
FIG. 2 is a perspective view of an embodiment of an overhead diverter assembly for use in the product handling system of FIG. 1.
Figure 3:
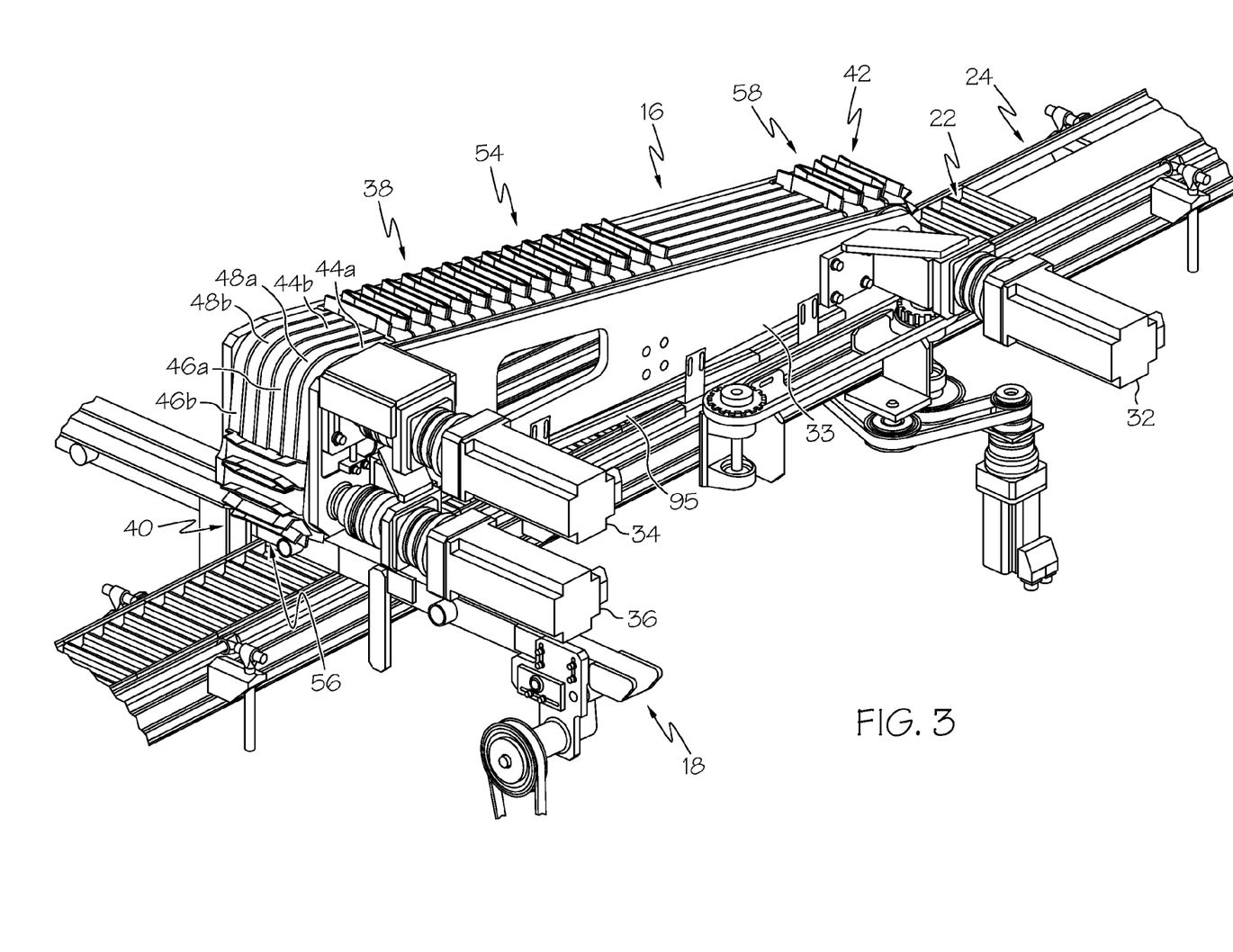
FIG. 3 is another perspective view of the overhead diverter assembly of FIG. 2.

Referring to FIGS. 2 and 3, the overhead diverter assembly 16 includes a frame 33 through which drive shafts 26, 28 and 30 of servo motors 32, 34 and 36 extend. Each servo motor 32, 34 and 36 is used to drive the respective flighted conveyor assembly 38, 40 and 42 and is controlled by the control system 45 (FIG. 1). Each flighted conveyor assembly 38, 40 and 42 includes a timing belt pair 44a and 44b, 46a and 46b, and 48a and 48b and trains 54, 56 and 58 of flights. The timing belt pairs, 44a and 44b, 46a and 46b, and 48a and 48b may each be separately driven by its respective servo motor 32, 34 and 36.

The servo motors 32, 34 and 36 may move their respective flighted conveyor assembly 38, 40 and 42 using idler sprockets and drive sprockets, each having teeth that mesh with teeth integrally formed in the timing belts 44a, 44b, 46a, 46b, 48a and 48b. Idler sprockets and drive sprockets may be arranged concentric to their drive shafts. The drive sprockets may be connected to their drive shafts by a key or other torque transmitting feature. The idler sprockets may spin freely around their drive shafts due to a bearing or bushing between the idler sprocket and the drive shaft. As one example, the servo motor 32 may drive the timing belts 44a and 44b. Drive sprockets may be keyed to the drive shaft 26 for rotation therewith which are used to move the timing belts 44a and 44b. The timing belts 44a and 44b may also routed over idler sprockets associated with the other drive shafts 28 and 30 to allow the timing belts 44a and 44b to move independently of the other drive shafts 28 and 30. Likewise, the servo motor 34 may drive the timing belts 46a and 46b. Drive sprockets may be keyed to the drive shaft 28 for rotation therewith which are used to move the timing belts 46a and 46b. The timing belts 46a and 46b may also be trained over idler sprockets associated with the other drive shafts 26 and 30 to allow the timing belts 46a and 46b to move independently of the other drive shafts 26 and 30. Likewise, the servo motor 36 may drive the timing belts 48a and 48b. Drive sprockets may be keyed to the drive shaft 30 for rotation therewith which are used to move the timing belts 48a and 48b. The timing belts 48a and 48b may also be trained over idler sprockets associated with the other drive shafts 26 and 28 to allow the timing belts 48a and 48b to move independently of the other drive shafts 26 and 28. It should be noted that while timing belts are described above, other mechanisms may be used, such as smooth flat belts, V-type belts, cables, chains, and the like.

Trains 54, 56 and 58 of flights 60 are each directly connected to a respective pair of timing belts 44a and 44b, 46a and 46b, and 48a and 48b. Train 54 of flights 60 is connected directly to timing belts 44a and 44b for movement therewith, train 56 of flights 60 is connected directly to timing belts 46a and 46b for movement therewith, and train 58 of flights 60 is connected directly to timing belts 48a and 48b for movement therewith. Movement of each train 54, 56 and 58 may be independently controlled by their associated servo motor 32, 34 and 36.

It should be noted that while each servo motor 32, 34 and 36 may independently control movement of its respective flighted conveyor assembly 38, 40 and 42 and associated timing belts 44a and 44b, 46a and 46b, and 48a and 48b, a single servo motor 32, 34 and 36 may also control movement of multiple flighted conveyor assemblies 38, 40 and 42, for example, to lock movement of two or more of the flighted conveyor assemblies 38, 40 and 42 together. For example, the drive sprockets and idler sprockets may have differing states to allow one of the servo motors 32, 34 and 36 to control multiple ones of the flighted conveyor assemblies 38, 40 and 42. In some embodiments, more or less timing belts and servo motors than those illustrated may be used. Additionally, a train may be connected to a single timing belt, or more than a pair of timing belts, such as three or four or more timing belts.

Figure 4:
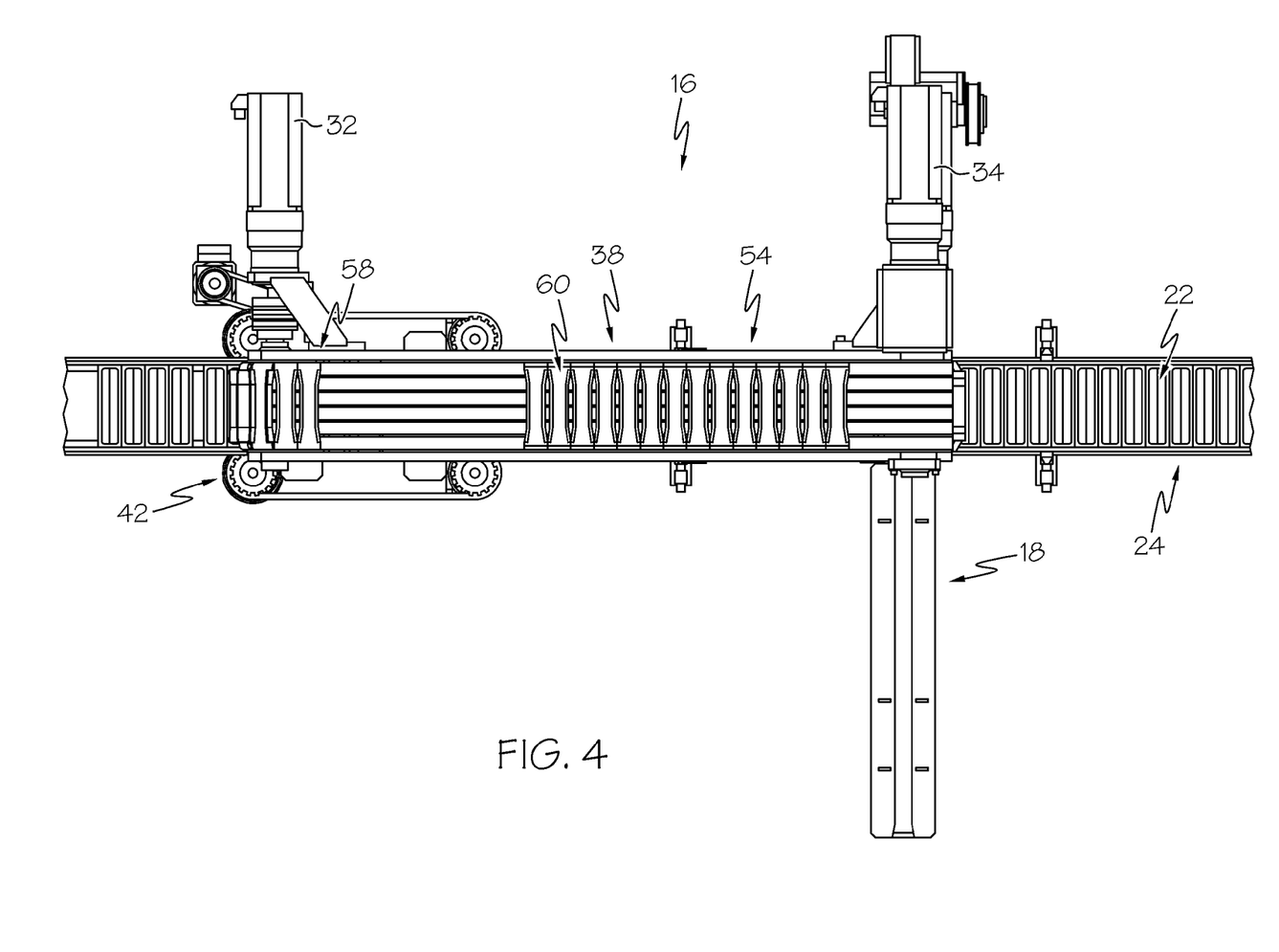
FIG. 4 is a top view of the overhead diverter assembly of FIG. 2.
Figure 5:
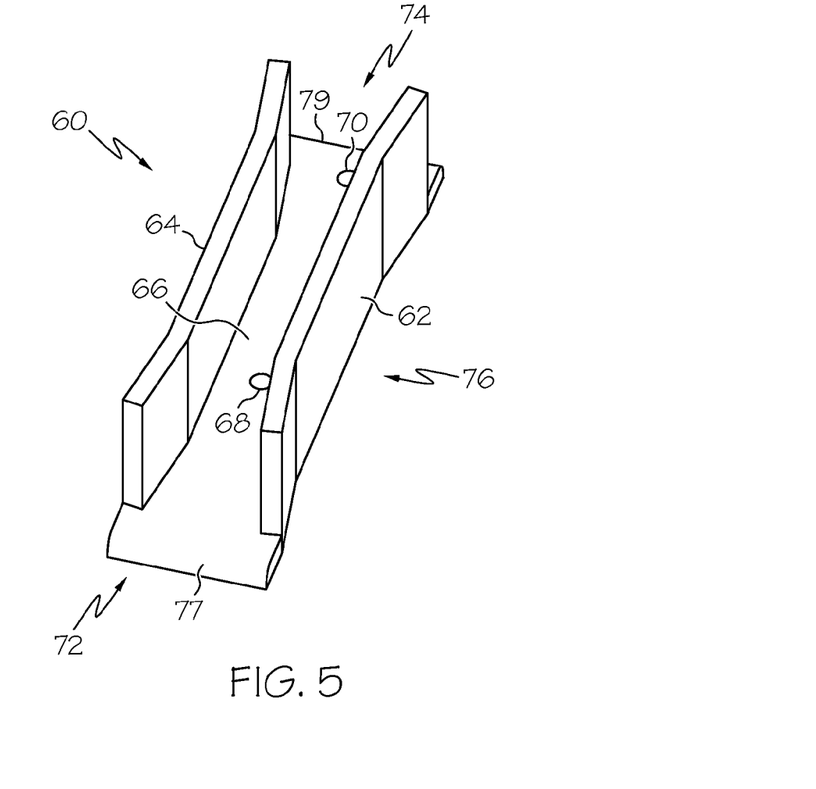
FIG. 5 is a perspective view of an embodiment of a flight for use with the overhead diverter assembly of FIG. 2.

FIG. 4 illustrates exemplary trains 54 and 58 of flights 60 connected to their respective flighted conveyor assemblies 38 and 42 and FIG. 5 illustrates a single flight 60 in isolation. While only trains 54 and 58 are shown in FIG. 4, the other train 56 may include similar components as trains 54 and 58. As used herein, the term "train of flights" is meant to include a series of flights that are connected directly to one of the flighted conveyor assemblies 38, 40 and 42 for movement therewith. Each flight 60 may be separately connected to its respective flighted conveyor assembly 38, 40 and 42 or multiple flights 60 may be connected directly together (e.g., using a hinged connection) and then connected to the respective flighted conveyor assembly 38, 40 and 42.

Referring particularly to FIG. 5, each flight 60 is U-shaped in cross section and includes a forward retaining flight member 62 and a rearward retaining flight member 64 that are connected together by a base member 66 extending between the forward retaining flight member 62 and the rearward retaining flight member 64. In some embodiments, the base member 66 includes connection structure (e.g., openings 68 and 70) that are located to connect to the timing belts 44a and 44b, 46a and 46b, or 48a and 48b associated with the respective flighted conveyor assembly 38, 40 and 42. In an alternative embodiment, the flights may not be U-shaped. For example, the flights may include a forward retaining flight member and a rearward retaining flight member that are both connected directly to their respective timing belts without a base member. The flights may also be constructed by using the forward retaining member 62 or the rearward retaining member 64 and may optionally include the base member 66 to form an L-shaped construction. The flights may also include the forward retaining member 62 or the rearward retaining member 64 without the base member 66. The flights 60 may be connected to the timing belts 44a and 44b, 46a and 46b, or 48a and 48b using any suitable connection such as screws, rivets, snaps, adhesive, welding, magnets, etc. or could me molded integrally to their respected belts. In some embodiments, the attachment may be configured to break or shear away in the event of jamming or malfunction.

The flights 60 include a first open end 72 and an opposite, second open end 74. The first open end 72 allows for ingress of the product and the second open end 74 allows for egress of the product during a pass through operation. At the first open end 72 and the second open end 74 the forward retaining flight member 62 and the rearward retaining flight member 64 each taper outwardly away from each other, increasing in width (in the conveying direction) from a central portion 76 of the flights 60. In some embodiments, the base member 66 may increase in thickness from the first open end 74 toward the central portion 76 and the second open end 74 to the central portion 76 (e.g., at portions 77 and 79). With this arrangement, a cross sectional entrance area at the first open end 72 and a cross sectional exit area at the second open end 74 may be greater than a cross sectional area at the central portion 76 of the flights 60. In other embodiments, the cross sectional areas at the first and second open ends may be about the same as the cross sectional area at the central portion 76. In some embodiments, the cross-sectional area may be largest at the first open end 72 and substantially smaller at the central portion 76 and the second open end 74.

As can be seen particularly by FIG. 4, the trains 54 and 58 may include flights 60 having about the same dimensions and may be substantially equally spaced in the conveying direction. In some embodiments, the flights 60 of the trains 54 and 58 have about the same length in the cross conveying direction such that, while they may be connected directly only to timing belts 44a and 44b for train 54 and timing belts 48a and 48b for train 58, they extend across and over each of the timing belts 44a and 44b, 46a and 46b, and 48a and 48b. By this arrangement, the timing belts 46a, 46b, 48a and 48b can move relative to the train 54 and timing belts 44a, 44b, 46a and 46b can move relative to the train 58, allowing for movement of each train of flights 60 relative to the other trains of flights 60. This arrangement also allows two or more of the trains 54, 56 and 58 to align their flights 60 in single file, one flight 60 adjacent the next in the conveying direction.

Figure 6:
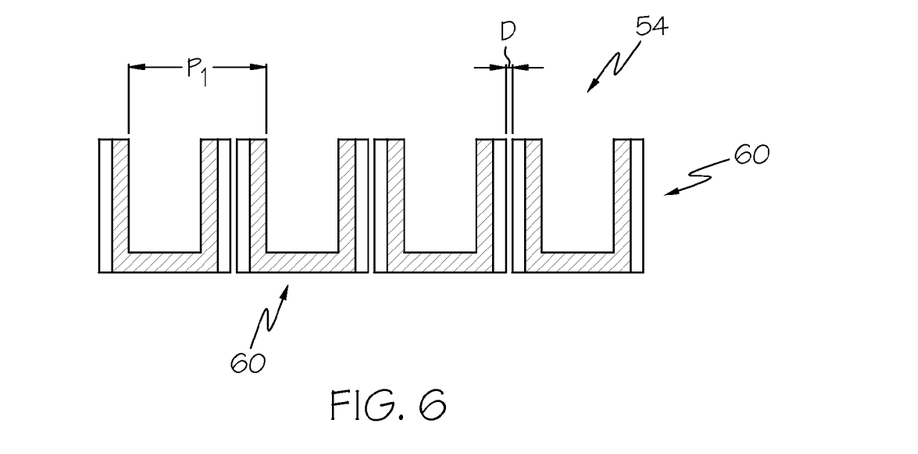
FIG. 6 is a section view of an embodiment of a train of multiple flights of FIG. 5.

FIG. 6 illustrates a section view through a center of the train 54 of flights 60. Any suitable number of flights 60 per train 54, 56 and 58 may be used. Additionally, each train 54, 56 and 58 may include the same number of flights 60 or at least one, two or three trains may include different numbers of flights 60. In one exemplary embodiment, each train 54, 56 and 58 includes 14 flights. However, more or less than 14 flights may be utilized. In some embodiments, the train 56 of flights 60 has a substantially constant pitch P1 between the adjacent flights 60. The pitch P1 may be measured between equivalent points on adjacent flights 60. The pitch P1 may be between about 30-60 millimeters, such as about 40 millimeters, or such as about 50 millimeters. In some embodiments, a clearance distance D between adjacent flights is maintained at about four millimeters or more, which can provide space between adjacent trains 54 and 58 and avoid collisions during operation. The clearance distance D may be less than four millimeters in some embodiments. The clearance distance D may be about zero, in some embodiments.

The flights 60 may be formed using any suitable process or combination of processes, such as casting, molding, machining, etc. Any suitable material may be used to form the flights 60, such as various metals and plastics. One exemplary plastic material having low-frictional properties is polyoxymethylene (POM).

Figure 7:
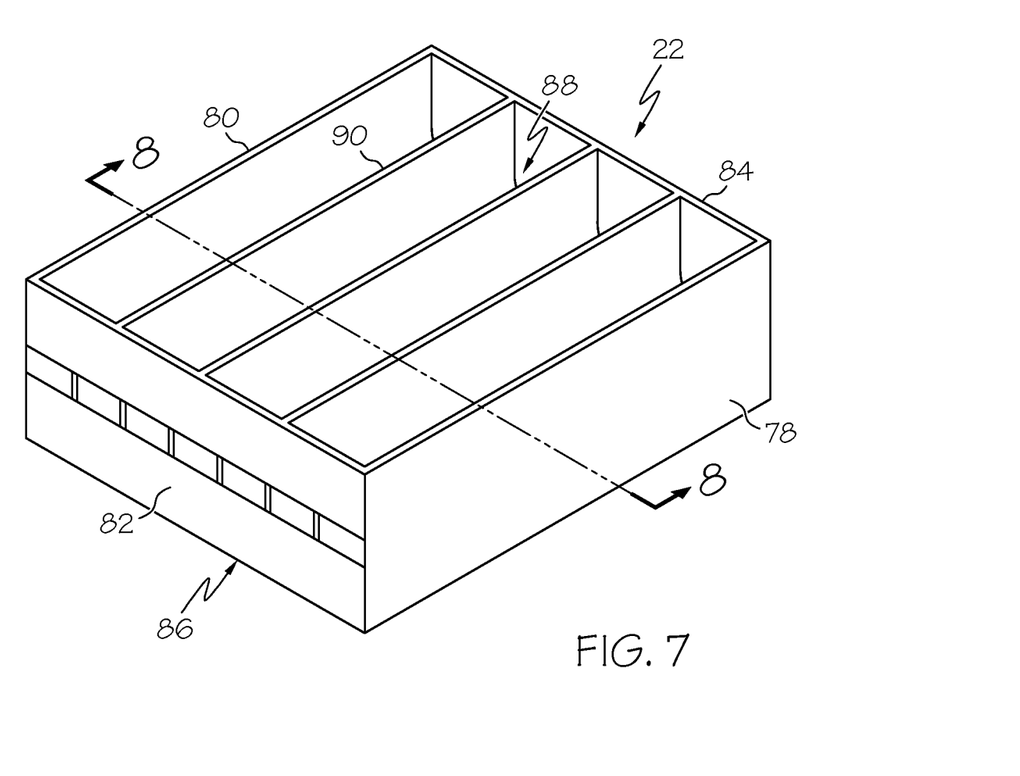
FIG. 7 is a perspective view of an embodiment of a cassette for use in the product handling system of FIG. 1.

Referring to FIG. 7, the flights 60 are used to divert product to the cassettes 22. The cassettes 22 may include a front wall 78, a rear wall 80 and side walls 82 and 84 extending between the front wall 78 and the rear wall 80. The cassettes 22 have a closed bottom 86 with multiple product receptacles (e.g., holding trays 88) arranged side-by-side from the front wall 78 to the rear wall 80. Retaining walls 90 extend substantially transverse to and between the side walls 82 and 84. Each product holding tray 88 is shaped to retain a product within the individual product holding tray 88. While a single column of multiple rows of holding trays 88 are illustrated, the cassettes 22 may include multiple columns and multiple rows of holding trays 88. In some embodiments, cartons or boxes may be provided having a volume for holding one or more products therein (e.g., in a stacked fashion).

Figure 8:
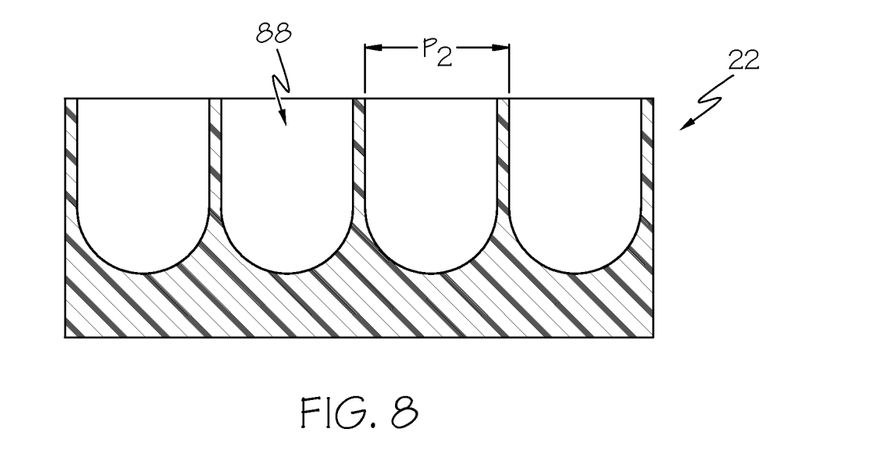
FIG. 8 is a section view of the cassette of FIG. 7 along line 8-8.

FIG. 8 illustrates a section view through a center of the cassette 22. Any suitable number of product holding trays 88 may be used. Additionally, each cassette 22 may include the same number of product holding trays 88, or at least some of the cassettes may include different numbers of product holding trays 88. In one exemplary embodiment, each cassette 22 includes four product holding trays 88. However, more or less than four product holding trays 88 may be utilized. In some embodiments, the cassettes 22 have a substantially constant pitch P2 between adjacent product holding trays 88. The pitch P2 of the cassettes 22 may be measured between equivalent points on adjacent product holding trays 88. The pitch P2 may be between about 30-60 millimeters, such as about 40 millimeters, such as about 50 millimeters. In some embodiments, the pitch of the cassettes 22 matches the pitch of the trains 54, 56 and 58 of flights 60. In other embodiments, the pitch of the cassettes 22 may be different than the pitch of the trains 54, 56 and 58 of flights 60.

Figure 9:
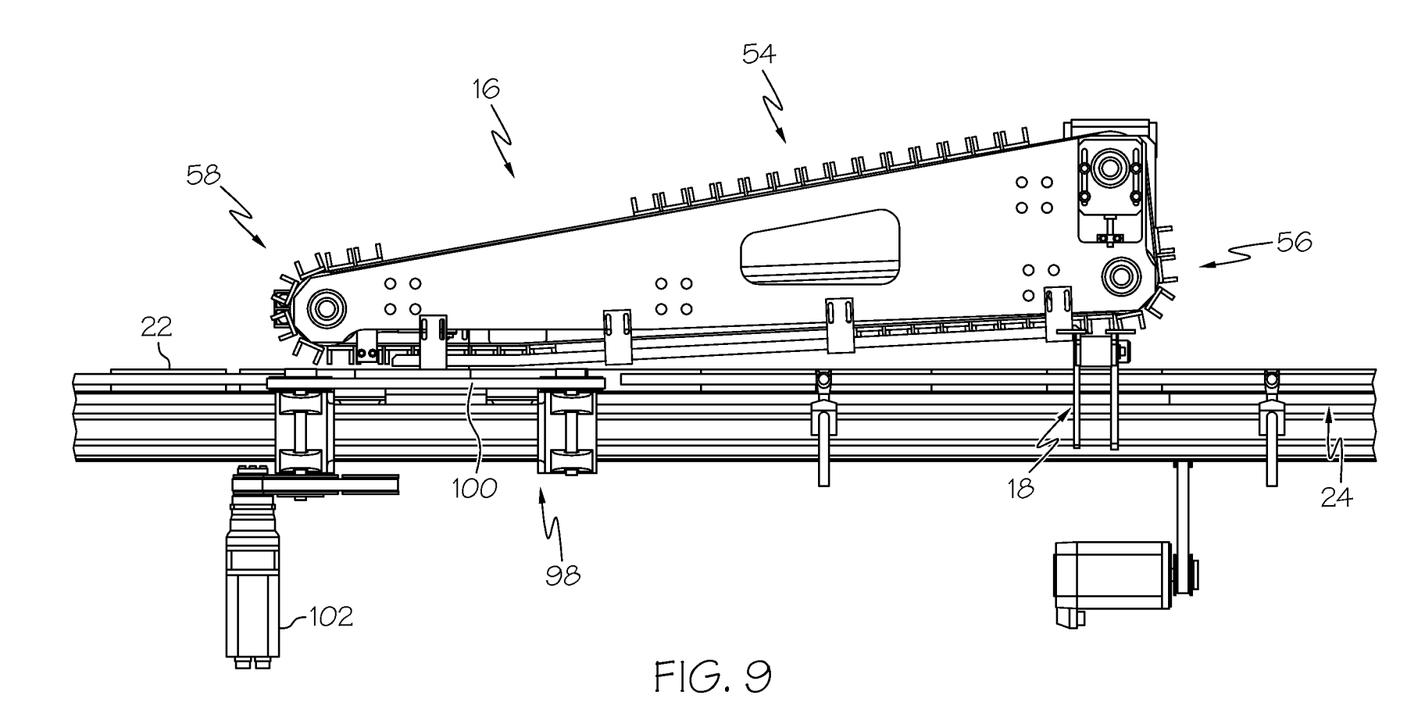
FIG. 9 is a side view of the overhead diverter assembly of FIG. 2.
Figure 10:
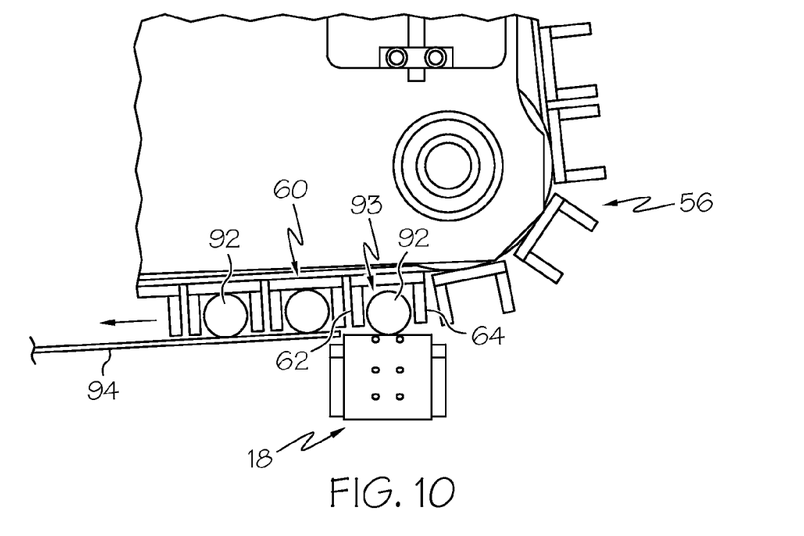
FIG. 10 illustrates an embodiment of a diverting process using the overhead diverter assembly of FIG. 2.

The flighted conveyor assemblies 38, 40 and 42 and their respective trains may each have four primary product handling modes: (1) a diverting mode, (2) a cassette filling mode, (3) a transition from diverting mode to cassette filling mode, and (4) a transition from cassette filing mode to diverting mode constituting a complete cycle through the overhead diverter assembly 16. Referring to FIG. 9, the trains 56, 58 and 54 are illustrated in the various modes with the train 56 in the diverting mode, the train 58 in the cassette filling mode and the train 54 in the transition from the cassette filling mode to the diverting mode. Referring also to FIG. 10, a diverting operation is illustrated where a trailing retaining flight member 64 of the train 56 is used in diverting a product 92 from the product conveyor 18. In this instance, the train 56 may be referred to as the diverting train 56. The product conveyor 18 conveys the product 92 into a tunnel 93 that is formed between a leading retaining flight member 62 and the trailing retaining flight member 64. The diverting train 56 is controlled by input from a sensor 65 (FIG. 1), e.g., an optical eye, laser sensor, etc. that whose output (or lack thereof) is used in indexing the diverting train 56 with a profiled move that is equal to the flight pitch for each product 92. The terms "profiled move" and "profiled motion" broadly refer to a controlled motion, such as a controlled motion having varying velocity. In some embodiments, the profiled move is an indexing motion (e.g., a start and stop type motion). The product 92 is then picked or stripped from the product conveyor 18 and pushed by the overhead flight 60 of the diverting train 56 to a transport containment device 94. In this embodiment, the transport containment device 94 is in the form of a smooth dead plate. The dead plate 94 angles downwardly from an elevation adjacent the product conveyor 18 to an elevation slightly above the cassettes 22. Other transport containment devices include vacuum nozzles, grippers, etc. that are used to retain the products 92 within their respective overhead flights 60.

Products 92 can be diverted on demand by rapidly indexing the flights 60 of the diverting train 56 as the product 92 is carried by the product conveyor 18. Timing of the indexing motion can be selected for gaining control of the product 92 (e.g., using the sensor 65) and pushing it substantially perpendicular to the original direction of travel on the product conveyor 18. The indexing flight 60 drags on the side of the product 92 and the friction between the flight 60 and the product 92 reduces the speed of the product 92 traveling along the product conveyor 18. The high acceleration of the indexing flight 60 generates enough frictional force to completely stop the product before the product travels the entire length of the flight 60 and exits the open end 74. In these embodiments, no stop plates are needed to stop the conveying motion of the product 92. This can reduce damage due to a collision by the product 92 into the stop plate. In some embodiments, the product may be slowed down by friction with the flight 60 and the motion of the product can be arrested upon collision with a guide rail 95 (FIG. 3) that extends along a length of the transport containment device 94.

Figure 11:
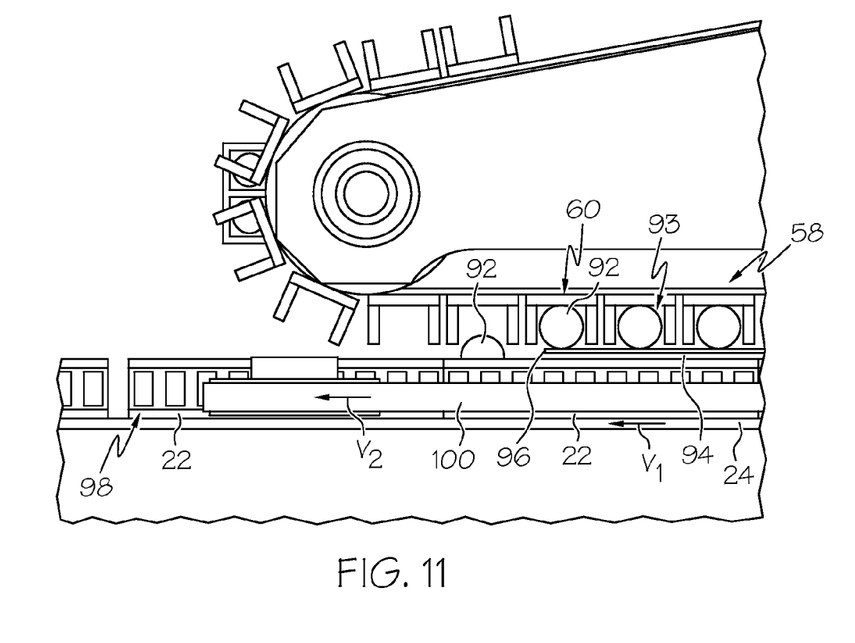
FIG. 11 illustrates an embodiment of a cassette filling process using the overhead diverter assembly of FIG. 2.

Referring to FIGS. 9 and 11, as the diverting train 56 of the flights 60 diverts the products 92 using the indexing motion (or allows products 92 to pass by the train 56), the train 58 of flights 60 transitions from the diverting mode to the cassette filling mode, traveling to a transfer location 96. (As shown, the train 58 has already transitioned from the diverting mode to the cassette filling mode.) In this instance, the train 58 may be referred to as the cassette filling train 58. In some embodiments, the cassette filling train 58 of flights 60 carrying the diverted product 92 may be moved in synch behind the train 54 which may be nearly complete with cassette filling. The cassette filling train 58 deposits the products 92 diverted into the cassettes 22 at the transfer location 96. In some embodiments, the motion of the cassettes 22 may be electronically geared to the motion of the cassette filling train 58 carrying the diverted products 92 along the dead plate 94, which can allow products 92 to drop (e.g., due to gravity) one at a time into respective product holding trays 88. In some embodiments, additional mechanisms may be employed to aid in the transfer of the product 92 from the flight 60 to the cassette 22, such as a mechanical stripper bar that pulls the product 92 from the flight 60. A jet of compressed air may be used to push product 92 from the flight 60. A vacuum can be used to pull product 92 into the cassette 22 and may be used to hold the product in the cassette 22.

A synchronizing system (e.g., a timing belt assembly 98) may be used to control the motion of the cassettes 22 during the transfer operation of products 92 from the cassette filling train 58 of flights 60 to the cassettes 22. The timing belt assembly 98 includes a timing belt 100 and a motor 102 (FIG. 9) that controls movement of the timing belt 100. The motor 102 may be controlled by the control system 45, for example. The cassettes 22 are conveyed by the cassette conveyor 24 prior to cassette 22 engagement with the timing belt assembly 98. The cassette conveyor 24 may be operating at a higher speed $V_1$ than the cassette motion due to the speed $V_2$ of the timing belt 100 at the transfer location 96, which can allow empty cassettes 22 to cue up against each other in a line upstream of the timing belt assembly 98 and then decouple or distance apart from each other once released by the timing belt assembly 98.

The pitch between the flights 60 and the cassettes 22 need not be the same. As one example, the flight pitch may be 50 mm and the cassette pitch may be 40 mm. The cassettes 22 may be driven synchronously with the flights 60 above such that the flight 60 containing product 92 is above (e.g., directly above) the cassette holding tray at the point of transfer where the transport containment device 94 ends.

During filling of cassettes 22, the speed of the cassette filling train 58 of flights 60 may be proportional to a distance between the cassette filling train 58 and the diverting train 56 diverting the product 92. As the distance between the cassette filing train 58 filling the cassettes 22 and the diverting train 56 diverting the product 92 increases, the cassette filling train 58 may decelerate. Alternatively, if the distance between the cassette filling train 58 and the diverting train 56 decreases, the cassette filling train 58 may accelerate. The maximum positive acceleration of the cassette filling train 58 and timing belt assembly 98 may be limited to avoid creating gaps between cued cassettes 22 entering the timing belt assembly 98. This maximum acceleration may be limited to less than the coefficient of kinetic friction between the cassettes 22 and the cassette conveyor belt 24 multiplied by gravitational acceleration. The kinetic coefficient of friction between the cassette conveyor belt 24 and the cassettes 22 may be determined as follows: The conveyor belt 24 is driven at full production speed. The cassette 22 riding on top of the moving conveyor belt 24 is fed into a linear force gauge that is held rigid with respect to the moving conveyor belt 24. The frictional force generated between the cassette 22 and belt 24 is measured directly by the force imparted by the cassette on the force gauge. The coefficient of friction is determined by dividing the measured friction force by the normal force. In this case, the normal force between the cassette and belt is the mass of cassette multiplied by gravitational acceleration.

The train 54 of flights 60 (FIG. 9), once finished with the cassette filling operation, transitions from the cassette filling mode to the diverting mode. In some embodiments, the train 54 of flights 60 is moved in coordination with the movement of the diverting train 56 so that constant spacing is maintained between the trains 54 and 56. In this instance, the train 54 may be referred to as the cued train 54, which is awaiting its turn to divert product 92. In some embodiments, the cued train 54 may move adjacent (i.e., catch up to) the diverting train 56 such that the pitch between the leading most flight 60 of the cued train 54 and the trailing most flight 60 of the diverting train 56 is substantially equal to the pitch P1 between adjacent flights 60 of the individual trains 54 and 56.

Figure 12:
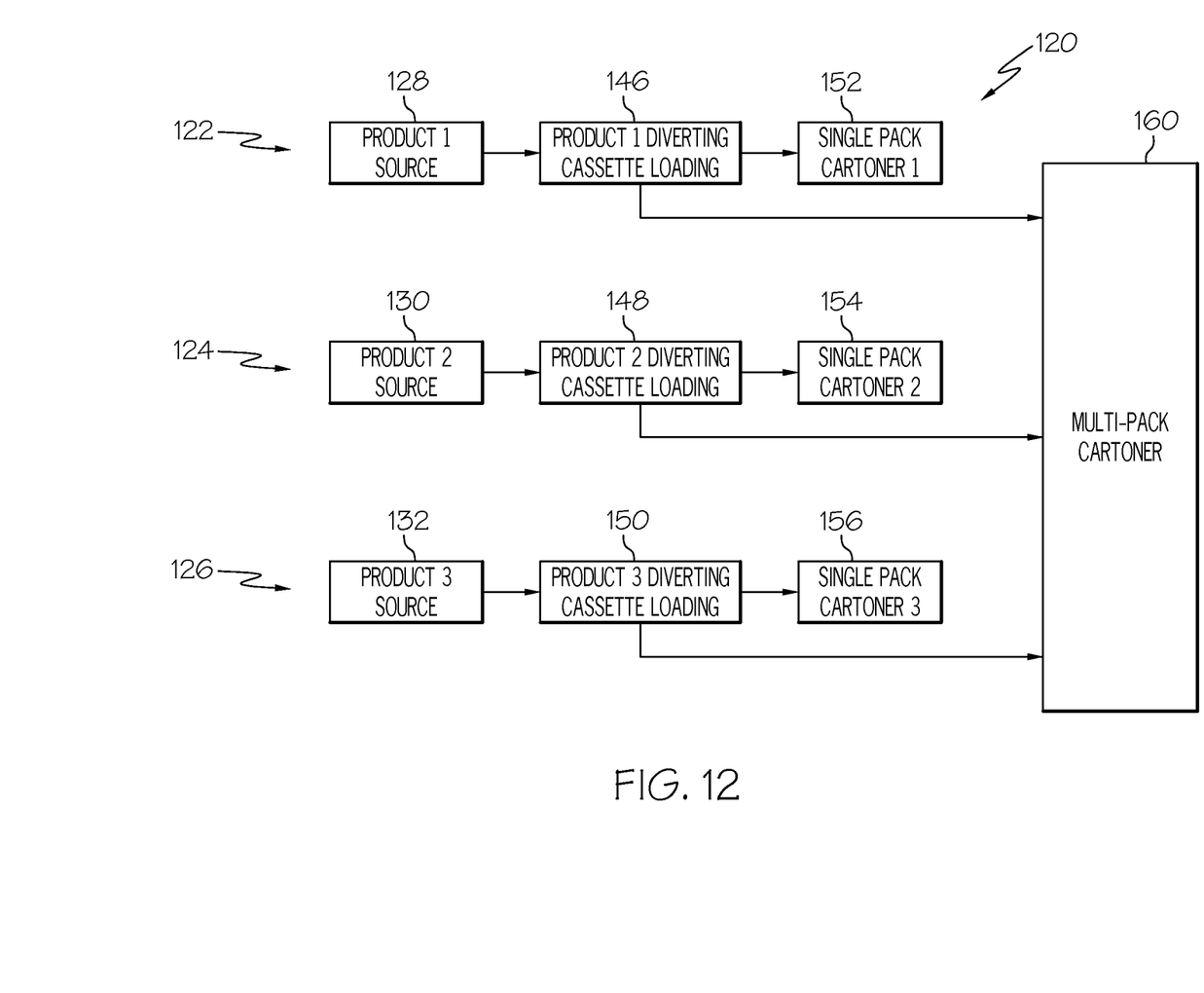
FIG. 12 illustrates an embodiment of a product handling system for handling multiple product types.

Referring to FIG. 12, an exemplary embodiment of a product handling system 120 includes multiple product lines (e.g., a Product 1 product line 122, a Product 2 product line 124 and a Product 3 product line 126). The Product 1, Product 2 and Product 3 may be provided at product source locations 128, 130 and 132. The product source locations 128, 130 and 132 may be, for example, a product converting line or a feeder system that supplies the product from bulk, cassettes, surge supply, etc. The Products 1, 2 and 3 may then be delivered to one or more overhead diverter assemblies 146, 148 and 150, each of which may be the same as or similar to the overhead diverter assembly 16 described above. The overhead diverter assemblies 146, 148 and 150, depending on operator instructions, may divert at least some or all of their respective Product 1, 2 or 3 and the cassettes of diverted products may be sent to a multi-pack cartoner 160, where a mix of the various products may be packaged together into a package. One or more of the diverter assemblies 146, 148 and 150 may also allow their respective Product 1, 2 or 3 to pass through the overhead diverter assemblies 146, 148 and 150. Such pass through of the Products 1, 2 or 3 may be sent to a single pack cartoner 152, 154 and 156, which can be used to pack a single type of the Products 1, 2 or 3 into its own carton.

In some embodiments, the single pack cartoners 152, 154 and/or 156 may be replaced by other equipment having a demand for non-diverted product. For example, additional downstream equipment such as a wrapper, printer, perforator, shrink wrapping, perfume addition, followed by other steps may be employed. Thus, the overhead diverter assemblies 146, 148 and/or 150 may be used to divert products in work on a converting line to enable producing products with varying stages of completion. The single pack cartoners 152, 154 and/or 156 may also be replaced with other packaging equipment, such as baggers, tray loaders, bundlers, etc. The multi-pack cartoner 160 may also be replaced by other packaging equipment, bulk storage, etc. In some embodiments, multiple overhead diverter assemblies may be placed in series to divert product to multiple, downstream stations packing and/or otherwise.

It should be noted that while cassettes 22 are described above, in alternative embodiments, the cassettes could be a tray with no separate or divided holding trays to separate products. In some embodiments, the cassettes may be replaced by a continuous chain or belt. The diverted products could be transported by other means after the transport containment device 94 such as conveyor, air conveying, vibratory feed, etc. The diverted products could also be fed into bulk or directly loaded into cartons, bags, or other packaging. Also, the diverted products could be fed into another downstream process or packaging step such as printing, perforating, wrapping, banding, shrink wrapping, perfume addition, etc.

The above-described systems and methods for handling products utilize an overhead diverter assembly for use in diverting some, but in some instances not all, product provided from a product supply. The passing product may be delivered to a first packaging location and the diverted product may be delivered to a second packaging location that is different from the first packaging location. The overhead diverter assemblies may utilize a rapid indexing action that picks the product from a supply conveyor while reducing damage to the product during the diverting process.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A product handling system, comprising:
   a product conveyor capable of transporting a plurality of products;
   an overhead diverter assembly comprising:
      a flighted conveyor situated substantially orthogonal to the product conveyor, the flighted conveyor comprising a flight;
      a transport containment device located at least partially below the flighted conveyor; and
      a control system that operates the overhead diverter such that the flighted conveyor has a diverting mode and a cassette filling mode, wherein, when the flighted conveyor is in the diverting mode, the flight moves in a profiled motion to acquire the product from the product conveyor at a location beneath the overhead diverter and transports the product along the transport containment device.

2. The product handling system of claim 1, wherein the flight forms at least a portion of a tunnel that has a first open end through which the product enters the tunnel while travelling along the product conveyor and an opposite, second open end, wherein during the diverting mode, the profiled motion of the flight being an indexing motion that prevents at least a portion of the product from passing through the second open end such that the product is acquired and transported along the transport containment device.

3. The product handling system of claim 1, wherein the flight is part of a train of connected flights that are connected to the flighted conveyor.

4. The product handling system of claim 3, wherein each flight of the train of connected flights includes first and second retaining flight members that are connected together to form a U-shaped flight.

5. The product handling system of claim 3, wherein the train of flights is a first train of first flights and the flighted conveyor is a first flighted conveyor, the overhead diverter assembly further comprising:
   a second train of second flights connected to a second flighted conveyor; and
   a third train of third flights connected to a third flighted conveyor.

6. The product handling system of claim 5 further comprising:
   a first drive system operatively connected to the first flighted conveyor that moves the first flighted conveyor in its diverting mode;
   a second drive system operatively connected to the second flighted conveyor that moves the second flighted conveyor in its diverting mode; and
   a third drive system operatively connected to the third flighted conveyor that moves the third flighted conveyor in its diverting mode.

7. The product handling system of claim 6, wherein the control system operates the overhead diverter such that when the first flighted conveyor including the first train of first flights is in its diverting mode,
   at least one first flight forms at least a portion of a tunnel to enable the product travelling along the product conveyor to enter the tunnel at a divert location,
   at least one second flight of the second train moves toward a transfer location where, with the second flighted conveyor in a cassette filling mode, the at least one second flight interfaces with a product carrying cassette to transfer a product from the at least one second flight to the product carrying cassette, and
   the third train of third flights moves away from the transfer location toward the first train of first flights.

8. The product handling system of claim 6, wherein the control system operates the overhead diverter such that when the first flighted conveyor including the first train of first flights is in its diverting mode,
   at least one first flight forms at least a portion of a tunnel to enable the product travelling along the product conveyor to enter the tunnel at a divert location,
   at least one second flight of the second train moves toward a transfer location, and
   at least one third flight of the third train moves toward the transfer location where, with the third flighted conveyor in a cassette filling mode, the at least one third flight interfaces with a product carrying cassette to transfer a product from the at least one third flight to the product carrying cassette.

9. The product handling system of claim 1, wherein the product is a wrapped tampon product.

10. A product handling system, comprising:
    a product conveyor capable of transporting a plurality of products;
    an overhead diverter assembly comprising at least three or more flighted conveyors, the overhead diverter comprising:
       a first flighted conveyor situated substantially orthogonal to the product conveyor, the first flighted conveyor comprising a first train of first flights for diverting products from the product conveyor;
       a second flighted conveyor situated substantially orthogonal to the product conveyor, the second flighted conveyor comprising a second train of second flights for diverting products from the product conveyor; and
       a third flighted conveyor situated substantially orthogonal to the product conveyor, the third flighted conveyor comprising a third train of third flights for diverting products from the product conveyor;
    a cassette conveyor including a cassette conveyor belt that moves cassettes toward a transfer location; and
    a control system that operates the overhead diverter such that each of the first, second and third flighted conveyors has a diverting mode and a cassette filling mode, wherein, when at least one of the first, second and third flighted conveyors is in the cassette filling mode, product diverted from the product conveyor is transferred to a cassette at the transfer location.

11. The product handling system of claim 10 further comprising a timing belt assembly including a timing belt that controls movement of the cassettes at the transfer location, a speed of the timing belt being different than a speed of the cassette conveyor belt.

12. The product handling system of claim 11, wherein the control system limits acceleration of the cassettes to no greater than about a coefficient of static friction between the cassettes and cassette conveyor belt times gravitational acceleration using the timing belt assembly.

13. The product handling system of claim 10 further comprising:
a first drive system operatively connected to the first flighted conveyor;
a second drive system operatively connected to the second flighted conveyor; and
a third drive system operatively connected to the third flighted conveyor.

14. A product handling system, comprising:
a flighted conveyor for transferring a collection of individual products, the flighted conveyor having variable speed;
a cassette conveyor having a substantially constant speed;
a plurality of cassettes disposed on the cassette conveyor, each of the plurality of cassettes comprising receptacles for receiving the collection of individual products from the flighted conveyor during a transfer operation;
a synchronizing system including an engaging structure that engages one or more of the plurality of cassettes to synchronize the speed and position of the one or more cassettes and the flighted conveyor during the transfer operation; and
wherein the speed and positioning of the cassettes are controlled by the cassette conveyor at a point before and after the transfer operation.

15. The product handling system of claim 14, wherein the synchronizing system comprises a timing belt including the engaging structure.

16. The product handling system of claim 15, wherein the engaging structure comprises an array of teeth that extends along a continuous length of the timing belt.

17. The product handling system of claim 14, wherein the flighted conveyor includes a train of connected flights that are connected to the flighted conveyor.

18. The product handling system of claim 17, wherein each flight of the train of connected flights includes first and second retaining flight members that are connected together to form a U-shaped flight.

19. The product handling system of claim 18, wherein the train of flights is a first train of first flights and the flighted conveyor is a first flighted conveyor, the overhead diverter assembly further comprising:
a second train of second flights connected to a second flighted conveyor; and
a third train of third flights connected to a third flighted conveyor.

20. The product handling system of claim 19 further comprising:
a first drive system operatively connected to the first flighted conveyor that moves the first flighted conveyor;
a second drive system operatively connected to the second flighted conveyor that moves the second flighted conveyor; and
a third drive system operatively connected to the third flighted conveyor that moves the third flighted conveyor.

* * * * *